United States Patent
Bilinski et al.

(10) Patent No.: US 8,751,577 B2
(45) Date of Patent: Jun. 10, 2014

(54) METHODS AND SYSTEMS FOR ORDERING AND VOTING ON SHARED MEDIA PLAYLISTS

(75) Inventors: Brandon Bilinski, Mountain View, CA (US); Kathryn Cushing, Mountain View, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 13/421,815

(22) Filed: Mar. 15, 2012

(65) Prior Publication Data

US 2013/0246522 A1  Sep. 19, 2013

(51) Int. Cl.
*G06F 15/16* (2006.01)
*G06F 15/173* (2006.01)

(52) U.S. Cl.
USPC .......................... 709/204; 709/218; 709/224

(58) Field of Classification Search
USPC .............. 709/203, 204, 206, 224; 707/104.1, 707/748; 725/135
See application file for complete search history.

(56) References Cited

U.S. PATENT DOCUMENTS

| | | | |
|---|---|---|---|
| 2007/0169165 A1* | 7/2007 | Crull et al. | 725/135 |
| 2007/0283008 A1* | 12/2007 | Bucher et al. | 709/224 |
| 2009/0234889 A1* | 9/2009 | Dupree | 707/104.1 |
| 2009/0265418 A1* | 10/2009 | Svendsen et al. | 709/203 |
| 2009/0265426 A1* | 10/2009 | Svendsen et al. | 709/204 |
| 2010/0121857 A1* | 5/2010 | Elmore et al. | 707/748 |
| 2010/0228740 A1* | 9/2010 | Cannistraro et al. | 707/748 |
| 2012/0179557 A1* | 7/2012 | Gross | 709/206 |
| 2012/0265328 A1* | 10/2012 | Kadirkamanathan et al. | 700/94 |

* cited by examiner

*Primary Examiner* — Quang N Nguyen
(74) *Attorney, Agent, or Firm* — Morris & Kamlay LLP

(57) ABSTRACT

Methods and systems for managing ordering of media items for play is provided. The method includes establishing a session between two or more connected devices, and receiving a request from one of the connected device to create a shared media playlist. The shared media playlist accepting addition of a plurality of media items from at least one of the connected devices. Then, collecting vote input from one or more of the connected devices. The vote input is applied to selected ones of the plurality of media items in the shared media playlist. The method processes the collected vote input to set a score for at least one of the plurality of media items. The method orders the plurality of media items in the shared media playlist, such that playing of the plurality of media items during the session follow the ordering.

25 Claims, 8 Drawing Sheets

METHODS AND SYSTEMS FOR ORDERING AND VOTING ON SHARED MEDIA PLAYLISTS

BACKGROUND

1. Field of the Invention

The present invention relates to methods, systems, and computer programs for ordering shared playlists in response to voting by the sharing participants.

2. Description of the Related Art

Internet applications have grown tremendously over the years and so has the functionality provided to devices that access those applications. One area that has seen such growth relates to social interaction and media sharing. The media that can be shared by connected users can vary widely, from simple pictures and audio to sophisticated interactive multimedia. However, controls for sharing and rendering media to a group are not as advanced. Currently, users that share a particular piece of media must rely on one participant to control what and when certain pieces of media are to be played. In other circumstances, too much control is provided to each user, which could lead to abuse or frustration by other participant users.

It is in this context that embodiments arise.

SUMMARY

Embodiments of the present invention provide methods, systems, and computer programs for ordering and voting on shared media playlists. The media can include any type of digital media item, and the voting occurs during a session between two or more users. In one embodiment, the sharing occurs during a connected conferencing session between the users, and the conferencing can be enabled via a social networking site or program. During the session, the connected users, via their devices, can select media items to play, e.g., songs, videos, etc., and the media items are ordered in the shared playlist. During the session, the users can vote on the various media items that were added by the participant users, and the voting assists in automatically ordering the media items in the playlist for play during the connected session. Voting is a mechanism that provides participant users a way of communicating their approval or disapproval of particular media items, and the ordering allows media items that are most approved by the participant users to rise to the top of the list (i.e., for more prompt play or rendering), during the session. During the connected session, the users can also be participating via a video feed and audio from the video can be provided along with audio from the selected media items being played from the playlists.

It should be appreciated that the present invention can be implemented in numerous ways, such as a process, an apparatus, a system, a device or a method on a computer readable medium. Several inventive embodiments of the present invention are described below.

In one embodiment, a method for managing ordering of media items for play is provided. The method includes establishing a session between two or more connected devices, and receiving a request from one of the connected devices to create a shared media playlist. The shared media playlist accepts addition of a plurality of media items from at least one of the connected devices, then collects vote input from one or more of the connected devices. The vote input is applied to selected ones of the plurality of media items in the shared media playlist. The method processes the collected vote input to set a score for at least one of the plurality of media items. The processing is configured to enforce an up-vote constraint and a down-vote constraint for each of the plurality of connected devices from which vote input is collected. The method orders the plurality of media items in the shared media playlist, such that playing of the plurality of media items during the session follow the ordering, wherein the method is executed by a processor.

In another embodiment, a non-transitory computer-readable medium comprising program instructions for managing ordering of media items for play is provided. The computer readable media includes program instructions for establishing a session between two or more connected devices, and for receiving a request from one of the connected device to create a shared media playlist. The shared media playlist accepts addition of a plurality of media items from at least one of the connected devices. Further provided are program instructions for collecting vote input from one or more of the connected devices, and the vote input is applied to selected ones of the plurality of media items in the shared media playlist. Instructions are also provided for processing the collected vote input to set a score for at least one of the plurality of media items. The processing is configured to enforce an up-vote constraint and a down-vote constraint for each of the plurality of connected devices from which vote input is collected. The program instructions also order the plurality of media items in the shared media playlist, such that playing of the plurality of media items during the session follow the ordering.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

The following embodiments describe methods, computer programs, and systems for ordering and voting on shared media playlists.

It will be apparent, that the present embodiments may be practiced without some or all of these specific details. In other instances, well known process operations have not been described in detail in order not to unnecessarily obscure the present embodiments.

As a general overview, the system enables dynamic ranking of media items added to a shared playlist. The ranking system allows for adding of media items to a playlist, and voting on the media items to set the most democratic playlist order when all users are contributing media items of their choice to the playlist during a session. Each media item will have a score associated with it and the higher the score, the closer it will be to the top of the queue (e.g., playlist). Every media item is entered into a table when it is added to the session playlist. The table will identify media item metadata, a current score, and the times played in a shared playlist session (e.g., play count). When a media item is added to the playlist, the media item in the playlist will have a score of 1-play count. In one embodiment, this scoring is performed on added media items so that people/users are not able to keep adding their favorite song to hear it over and over again. If the other users want to listen to that song again, they can easily vote it up, but by default its ranked low to start.

In one embodiment, users are not allowed to vote up or down their own tracks, and users are allowed to remove their own tracks from the queue. If any user adds the removed track back in the same session that it was removed, the track will be added back in with the same score it had before removal. In one embodiment, this mechanic prevents people from removing tracks with low scores and adding them back immediately to get a higher ranking. Further, in one embodiment, when a track is played, it is removed from the playlist, and the score is reset, and the play count for that session is increased. When a session ends, the table for that session is cleared.

Figure 1:
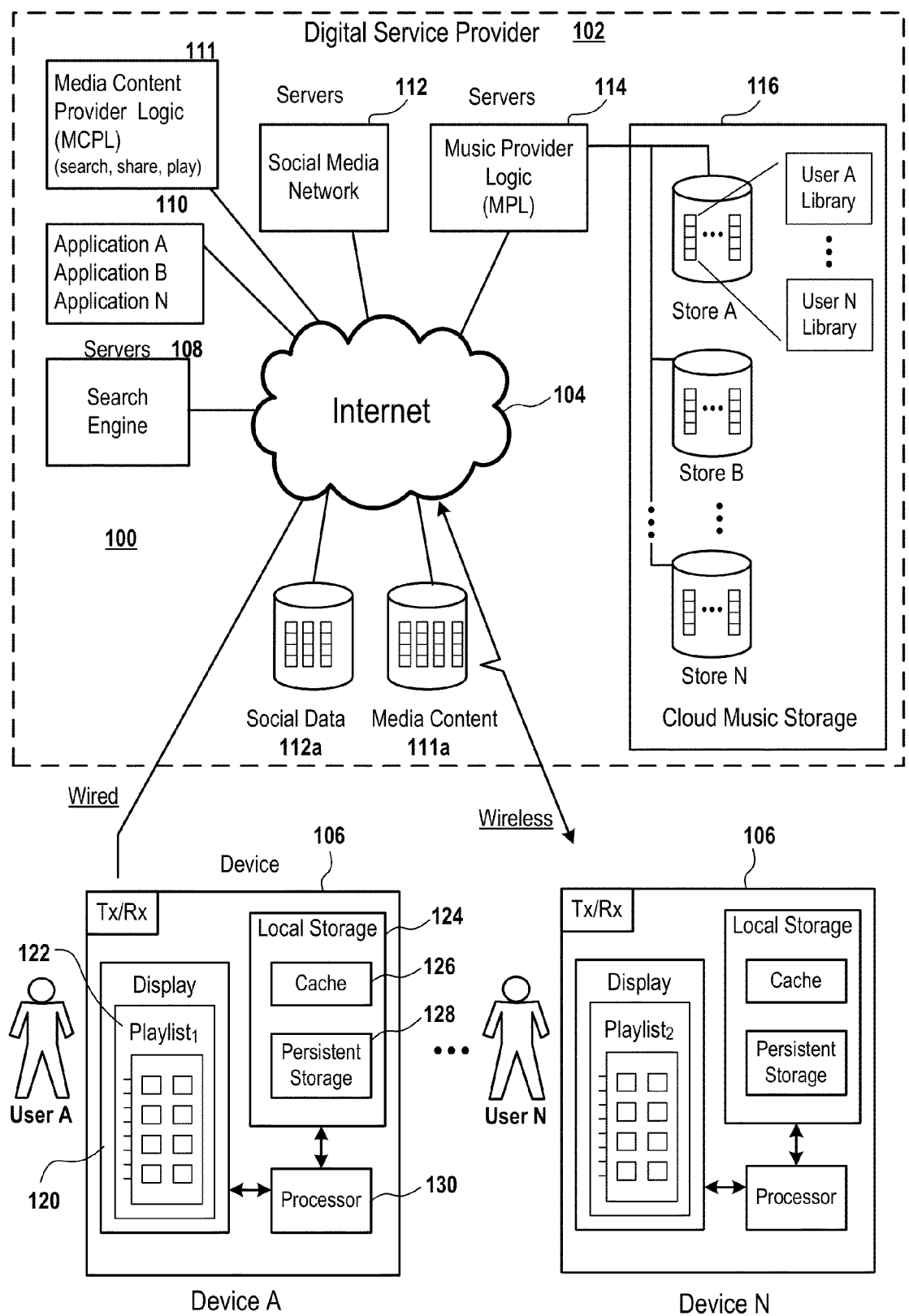
FIG. 1 illustrates a system diagram for enabling access to media over online system, in accordance with one embodiment of the present invention.
Figure 2:
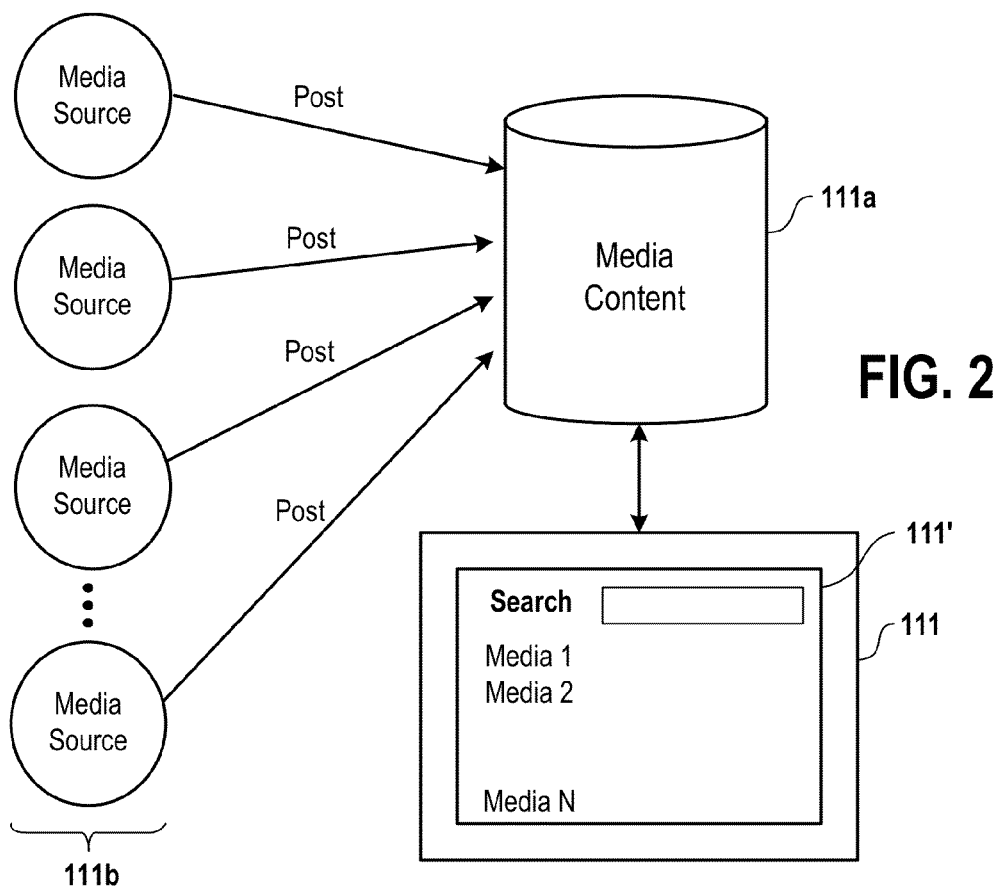
FIG. 2 illustrates a block diagram of media content storage that holds data received from a plurality of media sources, in accordance with one embodiment of the present invention.

With this overview in mind, an initial discussion regarding example systems for facilitating the processing of shared playlists will be provided with reference to FIGS. 1 and 2.

FIG. 1 illustrates a system diagram 100 that defines methods for accessing and playing music files stored in cloud storage and accessed from other online media storage. The system includes a plurality of servers that are connected to the Internet 104. The plurality of servers and storage are, in one embodiment, part of a digital service provider 102. The digital service provider 102 is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter. Additionally, servers can be provided for services that provide media content logic provider (MCPL) 111 to search, share and play online media, servers that provide social media network 112 services, and other servers to provide music related services. Storage can also be accessed to retrieve and store social data 112a and media content 111a. Further, third party services can also be accessed to complement or provide additional data.

One example digital service provider 102 can be Google Inc., of Mountain View, Calif. Other digital service providers can be more focused to provide only specific services, while others provide a variety of services for access, download, viewing, searching, etc. The content can vary greatly, but is commonly presented in digital format and displayed on monitors or screens of devices, computers, smart phones, tablets, etc.

The servers that provide music related services, in one embodiment, are illustrated by the music provider logic (MPL) 114, which executes over one or more servers that are connected to the Internet 104. The music provider logic 114 is shown connected to cloud music storage 116. Cloud music storage 116 is shown to include a plurality of storage systems, identified as store A, store B, and store N. The various storage systems that hold music data and music metadata, are provided with fast access to the Internet, for providing music data on demand to users requiring access to their music library stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g., wireless), cell tower communication, or interconnected wiring connected to Internet service providers. Device 106 is also shown to include a display having a screen 120, local storage 124, and a processor 130. Local storage 124 can include cache memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smart phone, a tablet computer, or hybrids that provide touch-screen capability in a portable form factor. One example device can include a portable phone device that runs an operating system and is provided with access to various applications (apps) that may be obtained over the Internet, and executed on the local portable device (e.g., smart phone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music providing logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and music provider logic 114 will provide access to the various users to their music files stored in the cloud music storage 116, based on their selections during use of the application.

FIG. 2 illustrates a block diagram of media content storage 111*a* that holds data received from a plurality of media sources 111*b*. The receipt of the media can be by way of posts (e.g., up-loading) from various entities over the Internet. The media sources 111*b* can be provided by individuals, commercial entities, and/or original content producers. The content can also include user generated content (UGC), as well as professionally produced content, or any size clip thereof.

For example, the media sources can include videos, video clips, advertisements, combinations of videos and advertisements, audio files, music files, music tracks, music videos, clips of music videos, clips of music tracks, albums including multiple music tracks, and combinations thereof. Generally speaking, the media content stored in storage 111*a* can be any type of media item that is in digital form, and is capable of being transferred, received, stored, and exchanged over the Internet.

In one embodiment, a media content provider logic (MCPL) 111 is capable of managing the different types of media items that can be uploaded or posted to the media content 111*a*. The MCPL 111, in one embodiment, is an online video sharing system that allows users to post videos, and allows other users to search and view videos saved in media content 111*a* storage.

As noted, the MCPL 111 is not limited to videos, and can store any type of digital content, as noted above. In practice, users access the media items stored in media content 111*a* by way of an interface 111', which allows users to search for media items for their desired purpose. Accordingly, media content 111*a* should be viewed as a repository of media items that can be accessed by any number of users over the Internet who may contribute media items, search for media items, view media items, share media items, comment on media items, etc.

Figure 3A:
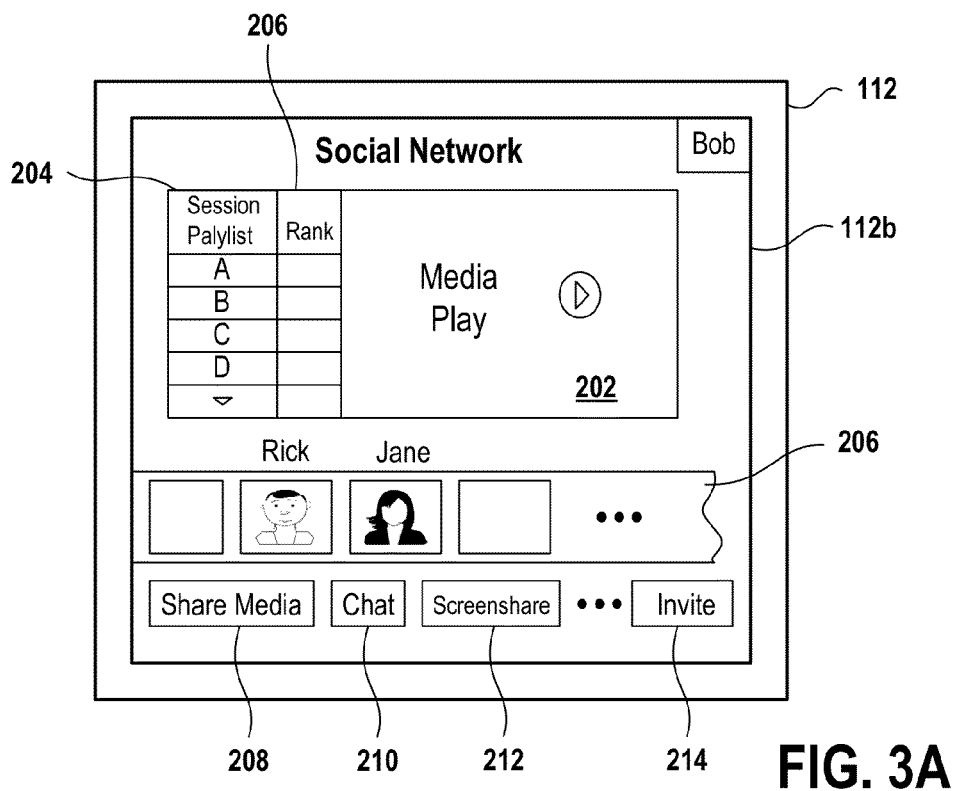
FIGS. 3A-3C illustrates embodiment where a social media network provides an interface by which users can access media content and share media in playlists during a session, and provide ordering based on voting feedback.

FIG. 3A illustrates one embodiment where the social media network 112 provides an interface 112*b*, by which a user can access media content, such as the media content stored in media content 111*a*. In this illustration, the interface 112*b* shows a homepage for a user named Bob, who is in the process of communicating with friends Rick and Jane. The homepage is the main page or one of the pages associated with Bob's social media networking account, and through Bob's social network and circles of friends, Bob can communicate with friends that are part of Bob's circles. In other embodiments, Bob can add friends to his circles and invite existing friends or new friends to a conferencing session. In one embodiment, the conferencing session can be business related or for entertainment. As an example, the users can set up the session to video conference and hang-out, discuss topics, etc. In this embodiment, both Rick and Jane can be viewed as conducting a conference sharing session with Bob, and a thumbnail of Rick and Jane are shown in section 206. In one embodiment, the thumbnail of Rick and Jane in section 206 may be a live video feed (e.g., real-time) that is being shared with Bob and the other members. Selected thumbnails can also be expanded to the main frame of the display, based on set configurations by each individual user.

Figure 3B:
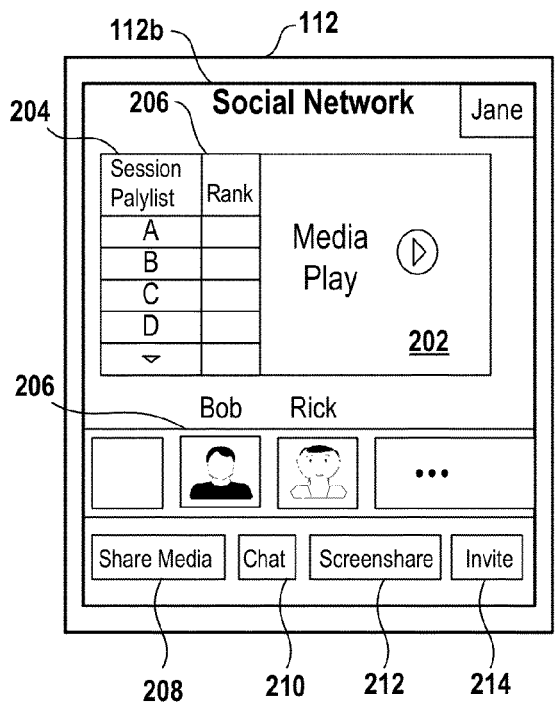
Figure 3C:
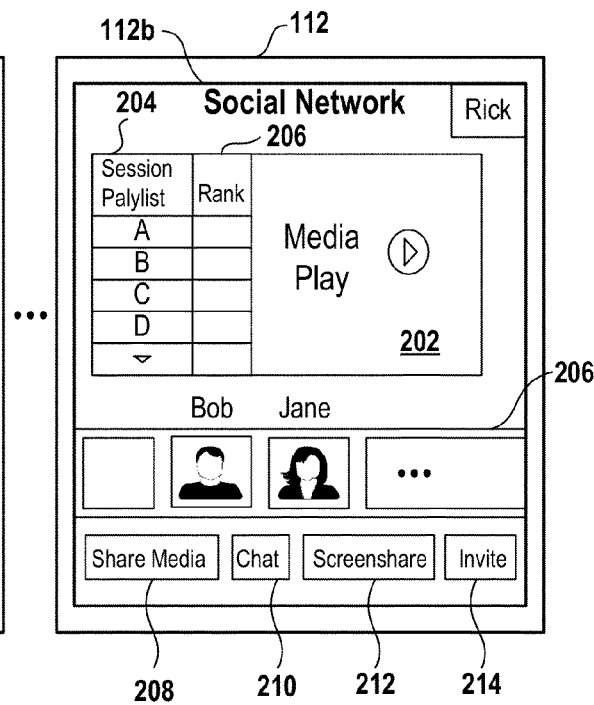

In one embodiment, Bob has decided to share media 208 with Rick and Jane during a session of interfacing during the conference sharing session. The conference sharing session, in this example allows Bob to share media items with Rick and Jane. FIGS. 3B and 3C illustrate how Jane and Rick also have their own interface 112*b*, and respectively have their section 206, where they can view the other two members of the conference sharing session.

Notice that Jane and Rick also have the ability to begin a share media 208 operation, during the session. FIGS. 3A through 3C assume that Bob, Jane and Rick have begun engaging in a media sharing session where certain media items A→D have been selected for sharing during the session. The media items, in one embodiment, may be a plurality of songs. The plurality of songs may have been selected by accessing the media content 111*a* through an appropriate interface 111', which may be integrated within a screen of the social media network 112. Now that a plurality of songs have been selected by the group, a session playlist 204 is produced.

Initially, the session playlist will add songs in accordance with their selection and assigned timestamp. The users can, in one embodiment, begin listening to the playlist in accordance with the order defined by the timestamp. Additionally, Bob, Rick and Jane may decide to rank the songs in the playlist based on their likes and dislikes, or the general mood. In order to do this, the users may access a ranking button 206 in the social network 112 that would allow each of the users to provide their votes regarding how well they like or dislike particular songs. Although only songs A, B, C, and D are illustrated, it should be understood that it is possible for Rick, Jane and Bob to add any number of songs, or media items to be shared in accordance with a session playlist 204.

In one embodiment, when the particular song is being played in accordance with the established order in the session playlist 204, information regarding the song can be shown in play region 202 of the interface 112*b*. For instance, the play region 202 can provide information regarding the song being played, display metadata information, display video associated with the song, display user comments regarding the song, etc. Still further, it should be appreciated that play region 202, playlist 204, and ranking 206 can be displayed in any number of formats within the interface 112*b*. The formats can include arrangement on the page in any way desired, such as hidden formats, pull downs, sidebars, footers, headers, and any geometric layout configuration.

Thus, it should be appreciated that the illustration of the session playlist 204, the ranking 206, and the play region 202 can take on any form or format, so long as the functionality provided with respect to ranking the media items in the session playlist are performed. Still further, the interface 112*b* shows the number of other buttons that can be provided during the conference sharing session. These buttons can include a chat button 210, a screen sharing button 212, and an invite button 214. The invite button 214 would, in one embodiment allow any one of the users to invite another friend to the conference sharing session. During the conference sharing session, the various participants can voice chat using a microphone, share items that the user is wearing, holding, make gestures, and any other communication possible with video chat.

During the conference sharing session, all the users may be listening to the session playlist 204. For instance, the session playlist can include a number of songs, and the songs may be playing at a lower volume to allow the various participants to communicate using their voice. In still another embodiment, the volume can be turned up so that all the participants can enjoy the music and make video gestures to each other. Any volume setting can be set for the music being played from the listed media items in the session playlist. This equally applies to short videos or clips that can be played in the order provided by the session playlist 204 to allow the participants (Jane, Bob and Rick) to view during the conference sharing session.

Figure 3D:
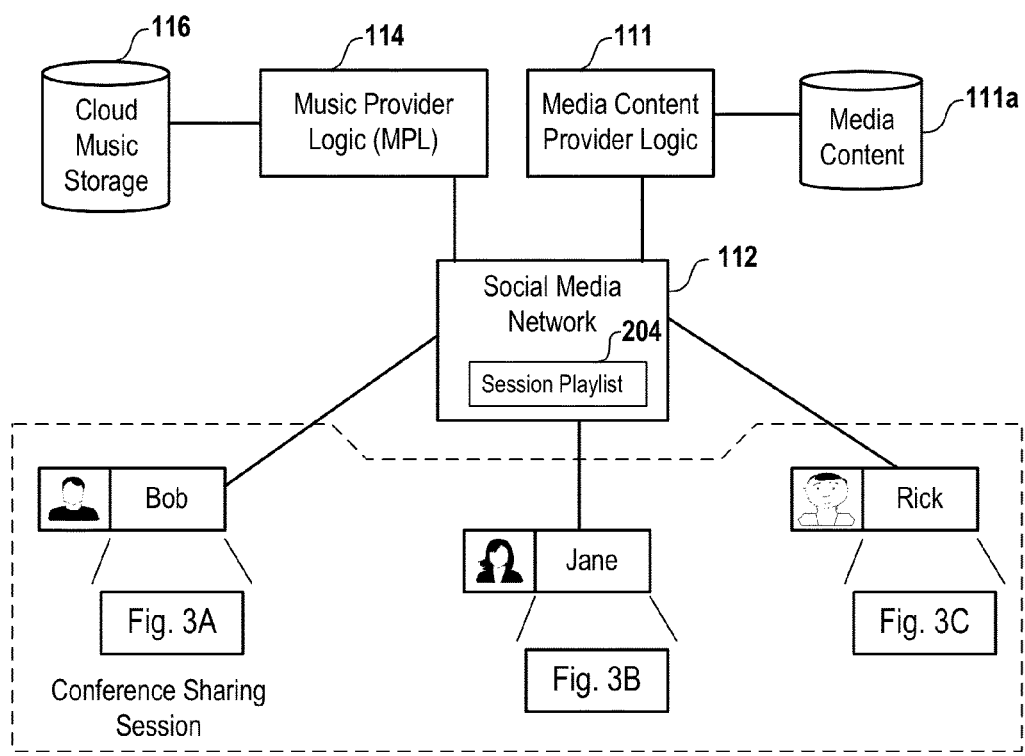
FIG. 3D illustrates a block diagram of a system that would allow the conference sharing session described with reference to FIGS. 3A-3C to be processed, in accordance with one embodiment of the present invention.

FIG. 3D illustrates a block diagram of a system that would allow the conference sharing session described with reference to FIGS. 3A-3C to be processed, in accordance with one embodiment of the present invention. In this example, a social media network 112 is provided as an interface, by which Bob Jane and Rick can communicate with each other during a conference sharing session. The social media network can also communicate with other servers, such as those that operate a media content providing logic (MCPL) 111, that communicates with its storage for storing media content 111a.

Other servers that the social media network 112 can communicate with to obtain media can include, for example music provider logic (MPL) 114 that has access to cloud music storage 116. As noted above, cloud music storage 116 may include music that is owned by any one of the users in the conference sharing session. In some embodiments, it is possible to provide sharing of particular music for listening by the various users that are conducting a conference sharing session.

In one embodiment, it is possible to identify particular pieces of music that are owned by all participants of the conference sharing session, to allow freedom of playing the music during a conference sharing session. In other embodiments, when the media content is obtained from a public resource, such as that provided by the media content provider logic 111, it is possible to share freely that content among the users in the conference sharing session, without regard to identification of ownership of that media item or items. Without limitation, the construction of access to media items through the social media network 112 can include other sources, such as third-party content not shown in FIG. 3D.

Figure 4:
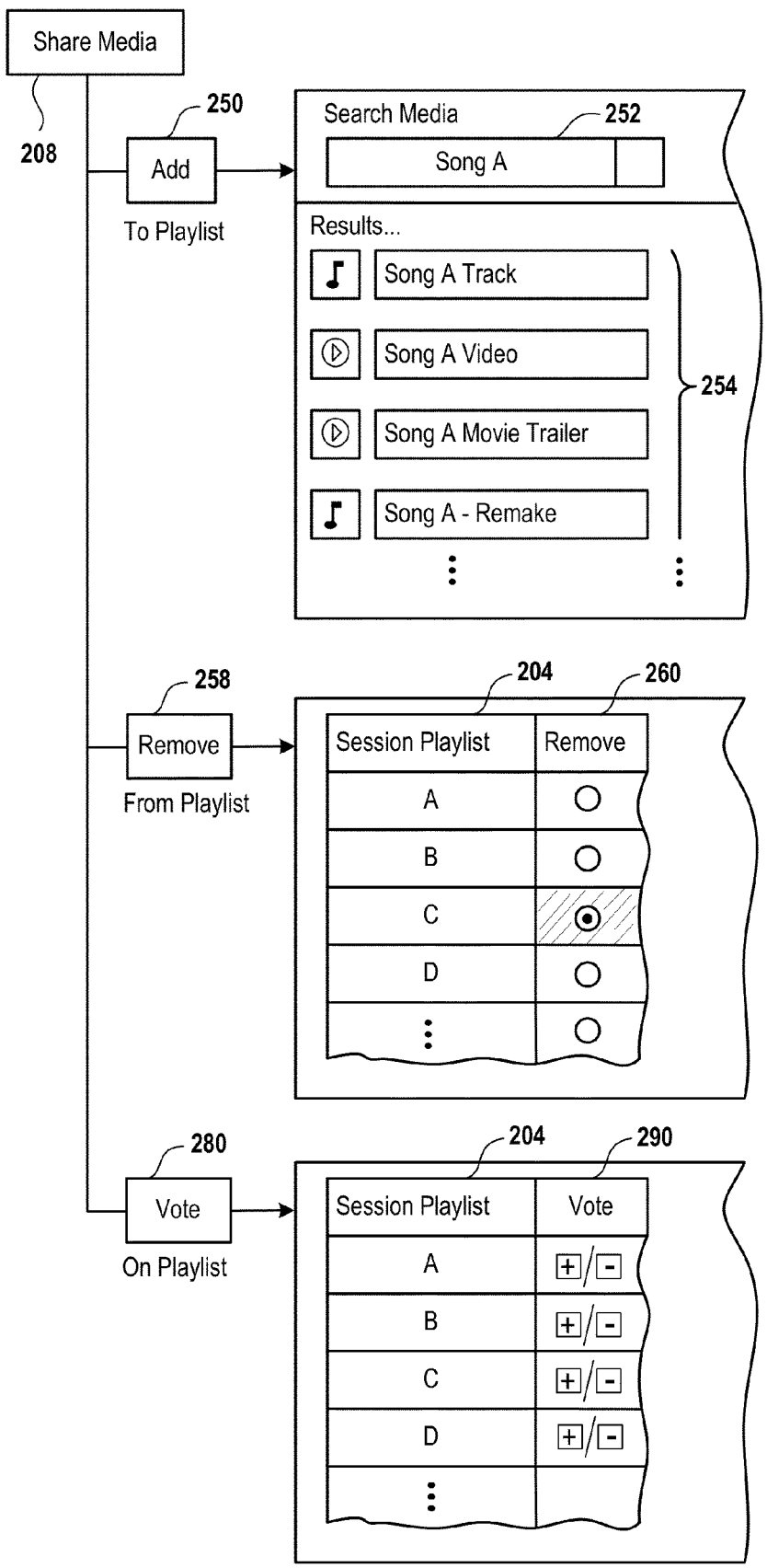
FIG. 4 illustrates a functional example of various commands that may be provided when conducting a conference sharing session, as shown in FIGS. 3A-3C, in accordance with one embodiment of the present invention.

FIG. 4 illustrates a functional example of various commands that may be provided when conducting a conference sharing session, as shown in FIGS. 3A-3C. As noted above, share media button 208 is provided for users to select when users wish to add media items to the playlist, remove items from the playlist, or vote on particular items currently in the playlist. As used herein, voting is a mechanism used by users to identify their likes and dislikes to particular songs or media items currently placed into a shared session playlist.

In the example of FIG. 4, was to share media button 208 is selected, the user can add to playlist by selecting a command 250 or similar button or interface, which takes the user to an interface where the user can search for a particular media item. In this example, the user accesses a search bar 252 and enters the text "SONG A" and the results for the search are shown in list 254. The example media items can include SONG A, as a music track, SONG A, as a video, SONG A, as a movie trailer, SONG A as a remake, etc. Once the user selects the appropriate format of the media item to add to the shared playlist, that particular SONG A is added. As noted above, the media item may have been obtained from the media content provider logic 111, or the music provider logic 114, or third-party Internet sites having suitable storage and access. Access to third-party Internet sites may include requiring a user account, password, and in some cases payment for the particular media.

If a particular user wishes to remove a song (media item) from the session playlist 204, the user can select the remove input 260, in one example. In one embodiment, the user who added the particular song to the session playlist is the one capable of removing the song from the session playlist 204. In other embodiments, all users are able to remove songs from the session playlist 204. Once removed, a new ordering is automatically generated based on the current scoring of the remaining songs.

Continuing with the example of FIG. 4, users can also provide their votes regarding any one of the songs added to the session playlist 204. Command 280 allows users to input their voting preferences via voting input 290. The voting input 290 is only one example of the format and construction of the user interface, and any type of user interface should be encompassed by the functionality associated with users delivering their voting preferences regarding any one of the media items. In one embodiment, users can provide their votes by signaling an up-vote or a down-vote. For purposes of illustration, a down-vote may be entered by the user by clicking or touching a negative symbol, while an up-vote may be entered by the user by clicking or touching a positive symbol. As used herein, the user input can be provided using any number of input mechanisms.

Clicking and touching are described herein as common methods for interfacing with a program, but other types of input, such as voice input, gesture input, tablet input, cursor input, stylus input, tap input, etc., may be used to communicate with the interfaces of the system that managed the session playlist 204.

Once the user has provided their votes by way of voting input 290, that information is processed by scoring logic 354, as will be described below with reference to FIG. 6. During the session, the various users participating in the session can provide their votes regarding any one of the media items in the session playlist 204. In one embodiment, users that add a particular media item to the session playlist 204 would not be allowed to vote up or vote down their own media items. However, users are allowed to remove their own media items from the session playlist, and at that point the media item will not be played.

If any user adds the removed media item back in the same session that it was removed, the media item will be added back in with the same score it had before removal. This mechanic is provided to prevent users from removing media item with low scores and adding them back immediately to get a higher score, and therefore ranking. When a media item is played from the session playlist 204, it is removed from the session playlist, and the score is reset, and the play for that session is increased.

Figure 5:
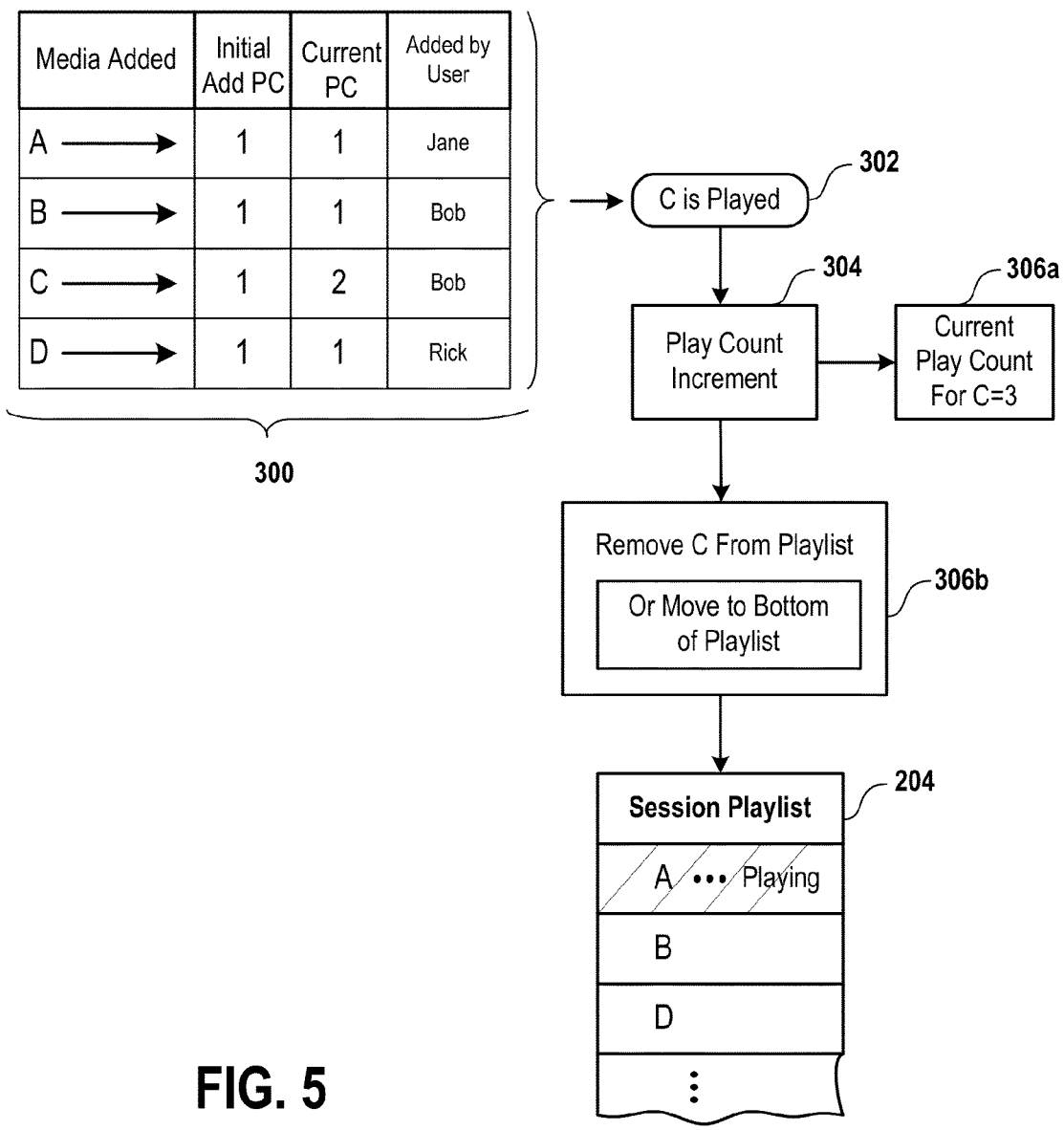
FIG. 5 illustrates one example of adding media items (e.g., songs) to the session playlist, during a session, in accordance with one embodiment of the present invention.

FIG. 5 illustrates one example of adding media items (e.g., songs) to the session playlist, during a session, in accordance with one embodiment of the present invention. When media items are added, the initial play count is automatically set to (1-play count). If the play count is 0, then the value is "1", as shown in of table 300. The current play count is also tracked in table 300, showing in this example that media item C has been played once (Play Count "PC"=2), while all other media items retained their initial play count (PC=1).

Table 300 also shows that each media item added to the session playlist 204 will be tracked to identify which of the users added the particular media items. In this example, the participants of the session include Jane, Bob and Rick, and their respectively added media items are identified in the table 300. Once a particular media item is played 302 during the session, the play count is incremented 304. In this example, media item C has just been played and the current play count is increased to 3, in 308a, and media items C is removed from the playlist in 306b. In one embodiment, media item C is simply moved to the bottom of the session playlist 204, instead of removing it from the playlist.

Additionally, the current status of the session playlist 204 can be displayed to the participants of the session while the participants are engaged in the session. Any icon or graphical representation may be provided to show which of the media items currently playing. In the example of FIG. 5, the session playlist 204 shows that media item A is currently playing. Additional information, such as metadata, regarding media item A can also be displayed in a graphical user interface to provide the users with more contextual information regarding media item A during the session.

Figure 6:
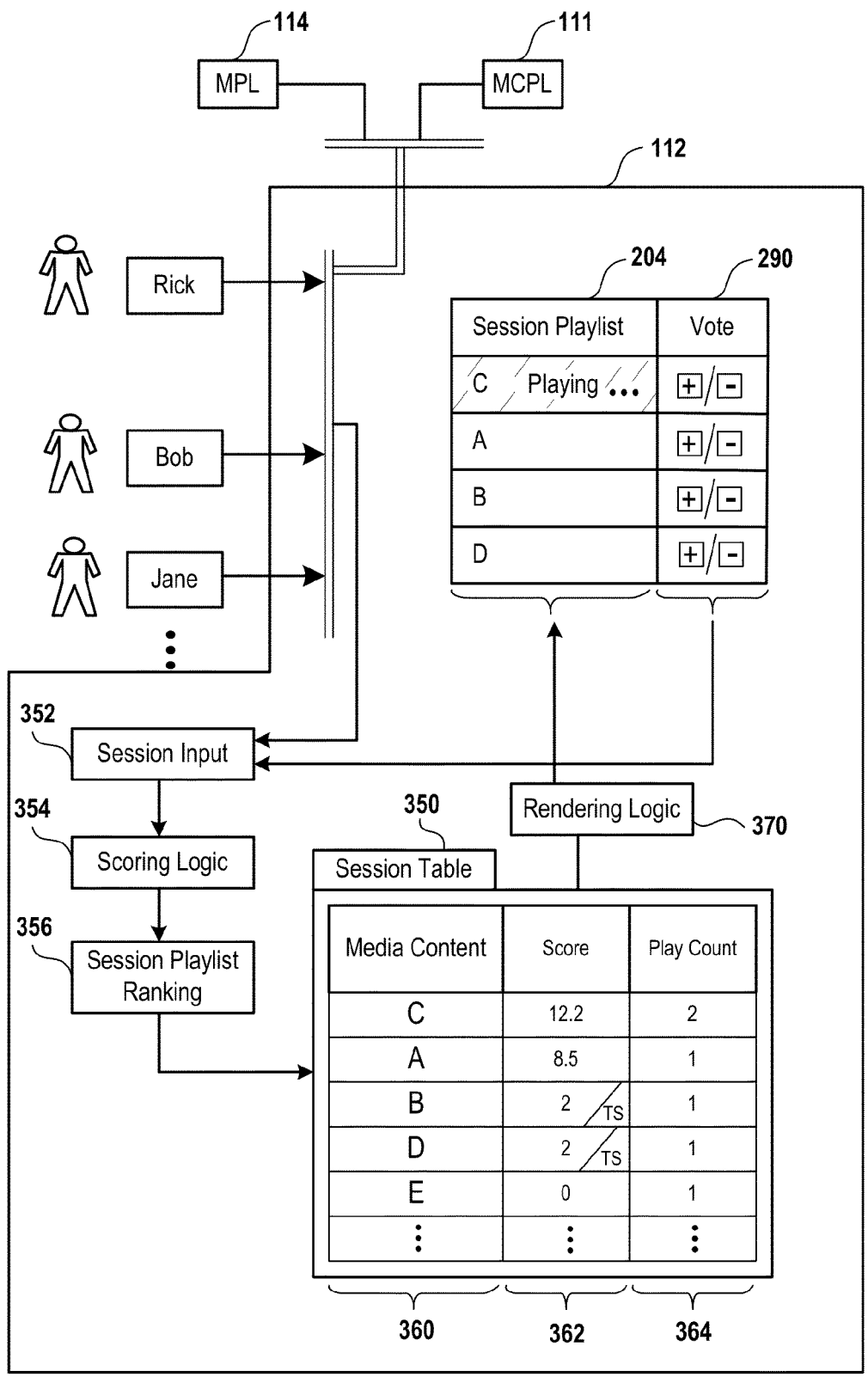
FIG. 6 illustrates an example of the scoring mechanic implemented to manage a session playlist, during a session of engagement between a number of users, in accordance with one embodiment of the present invention.

FIG. 6 illustrates an example of the scoring mechanic implemented to manage a session playlist 204, during a session of engagement between a number of users, in accordance with one embodiment of the present invention. In this example, users Rick, Bob and Jane are participating in a session facilitated through a social media network 112. During participation in the session, the users, using their computing devices (mobile or non-mobile), can add media items to the session playlist 204 from any number of sources. As mentioned above, the sources may include a media content provider logic source 111, a media provider logic 114, or third-party sources that may be search for, identified, and added to the session playlist.

During the session, the users may provide session input 352 regarding the session playlist 204. The session input can include providing voting input 290 regarding any of the media items in the session playlist. As illustrated, media item C is currently playing. It is likely that while the media item is playing, the users may provide their respective votes regarding the media item C.

The users can also provide their voting preferences (approval, disapproval, rating, comment, etc.) regarding any of the media items in the session playlist 204. This voting input is then communicated as part of the session input 352. The session input is provided to scoring logic 354 that identifies voting input 290, and processes the voting input 290 to effect the score of any one of the media items in the session playlist 204.

As will be described with reference to FIG. 7, the voting input 290 must be analyzed to determine whether or not particular users are able to provide a particular type of voting. Additionally, depending on whether the voting is an up-vote or a down-vote, the processing will configure inappropriate score adjustment for the particular media items in the session playlist 204. Once the scoring logic 354 has processed the received voting input 290 from any one of the users during the session, the scoring logic 354 will communicate with session playlist ranking 356.

Session playlist ranking 356 will receive the adjustments from the scoring logic 354 for any one of the media items in the session playlist 204, and make adjustments to a session table 350. Session table 350 maintains an identification of the media content 360, the score 362 for each media item, and a play count 364. As shown, the scoring provided for each media item in the session table 356 will depend on whether the votes are up or down, whether the votes are coming from users that added the media item or not, and other processing.

In one embodiment, once the score has been generated, the scoring 362 is used to rank the media items 360 in the order of most popular, such that the most popular media items will be played first in the session playlist 204, during the session. Once the session table 350 has been adjusted in accordance with the session playlist ranking 356, the ranking information is used by rendering logic 372 populate and adjust the session playlist 204 in a dynamic manner during the session. Thus, during the session, Rick, Bob and Jane will be viewing the session playlist adjust based on the scoring provided by the group.

Figure 7:
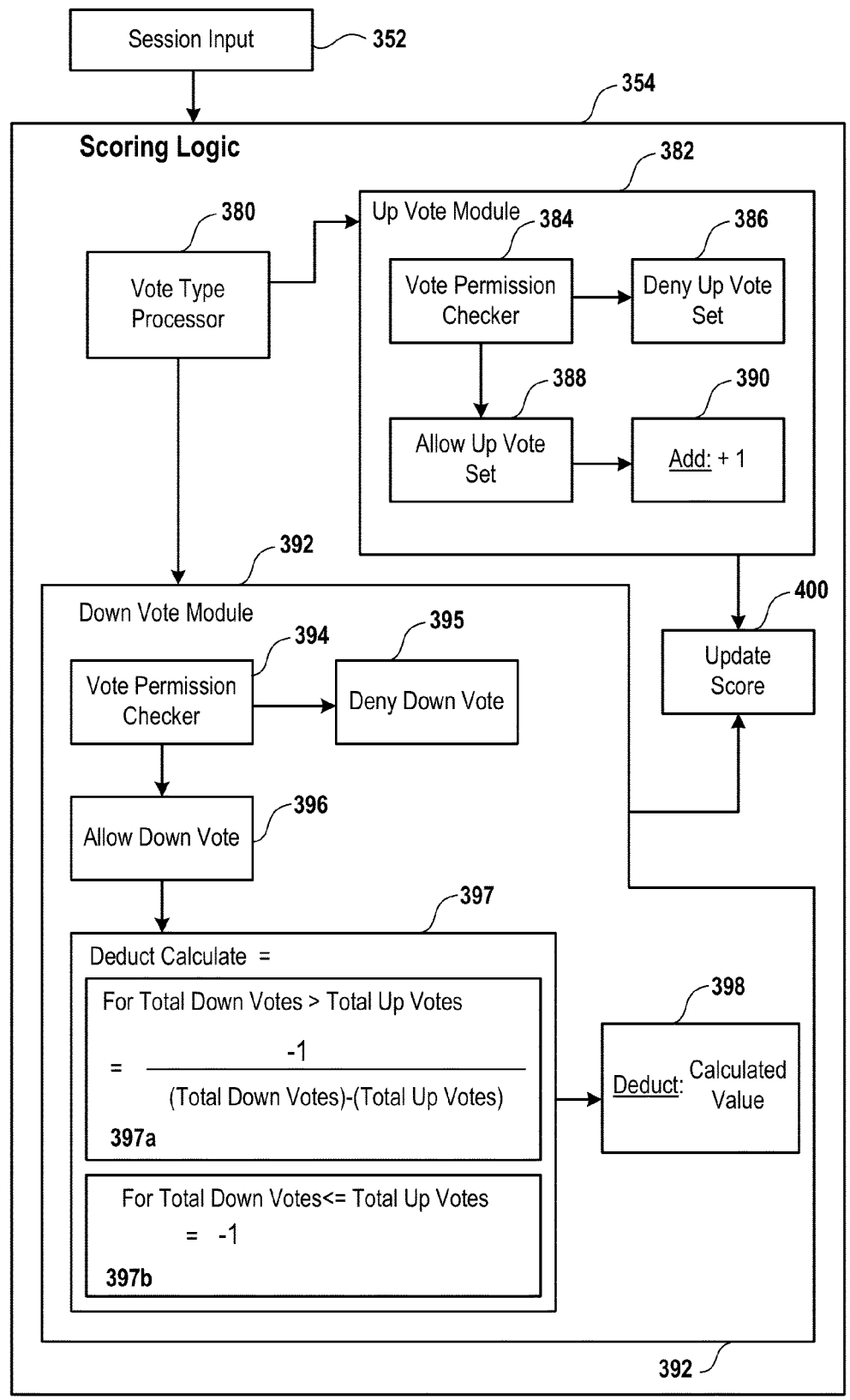
FIG. 7 shows a more detailed diagram of scoring logic, in accordance with one embodiment of the present invention.

FIG. 7 shows a more detailed diagram of the scoring logic 354, as discussed with reference to FIG. 6. Scoring logic 354 receives the session input 352. As noted above, the session input 352 can include information regarding media items added to the session playlist 204, media items deleted from the session playlist 204, voting of up or down regarding any one of the media items in session playlist 204, etc. This input is provided to the scoring logic 354.

Scoring logic 354 will first determine the type of vote received for any one of the media items. This processing will be done by a vote-type processor 380. Vote-type processor 380 will determine if the vote is an up-vote or a down-vote. If the vote is an up-vote, the vote-type processor 380 will communicate with the up-vote module 382. The up-vote module 382 will execute a vote permission checker 384 that will determine whether the up-vote came from the person who added the media item or a person participating in the session. If the up-vote came from the person who added the media item, the vote permission checker 384 will communicate with a deny up-vote set 386. Deny up-vote set 386 may send a message to the user indicating that they are not allowed to up-vote and media item that they have added to the session playlist.

In another embodiment, instead of communicating the message, the system will simply not process the up-vote by the user when that user added that particular media item to the session playlist 204. If the up-vote is coming from a person other than the one who added the media item, the allowed up-vote set 388 is processed and operation 390 will add a +1 point to the score of that media item. Thus, in this embodiment, each up-vote is worth in +1 point. This score adjustment is then communicated to an update score module 400. The update score module 400 communicates with the session playlist ranking 356 of FIG. 6 to allow the session table 350 to be updated and ranked.

If the vote-type processor 380 determines that the vote is a down-vote, the vote permission checker 394 will first check to see if the down voting is coming from the person who added the media item being voted on. In one embodiment, down voting is allowed to occur by any user, no matter if they are the one that added the media item or not. In another embodiment, down voting is not allowed to occur by the user that added the particular media item, and a deny down-vote set 395 will execute, to disallow the down voting by that particular user.

As noted above with respect to deny up-vote set 386, the deny down-vote set 396 may communicate with the user to provide a message regarding the disallowance of the vote or simply not allow the voting. If down voting is allowed, allow down-vote set 396 is processed. This processing will include a calculation to determine the appropriate deduction for that particular down-vote, in operation 397. Operation 397 will include two different circumstances, which will be processed before the appropriate down-vote point value is assigned.

In one embodiment, each down-vote is worth −1/(total down-votes−total up-votes), when the total down-votes is greater than the total up-votes, in 397a. If the total down-votes is less than or equal to the total up-votes in 397b, then each down-vote is worth −1. The value determined for the down-vote is then communicated to module 398, where the deduction is made based on the calculated value. This deduction, is communicated to the update score module 400, which communicates with the session playlist ranking 356. Thus, by applying a up-vote constraint and a down-vote constraint, it is possible to prevent abuse by particular participant users, which could spoil the greater enjoyment by the group of participant users. Again, as noted above, the session playlist ranking 356 is configured to provide an update of the score of the media item, which influences and triggers the adjustment and reordering of the media items in the session playlist 204. The reordering is therefore an automatic process that occurs in a dynamic manner during an interactive session, based on the feedback voting provided by the users of the session, as adjusted by the example constraints.

By enforcing this voting mechanic or constraint, users are prevented from down voting everyone else's media items to influence playing just the media items in the playlist for items added by that particular user. For purposes of example only, assume that there are 11 media items (songs) in the playlist queue (one song from userA and 10 from other users). If userA down-votes all 10 songs, each vote will only be worth −0.1 point. Even though that will put all songs lower than userA's song (0.9 score compared to 1.0), all it would take would be one down-vote from any other user of UserA's song to make it lower than all his down-votes (0.0 versus 0.9).

In one embodiment, ties in score will also need to be handled. Songs (media items) with the same score and the same number of votes will be ordered by the timestamp when they were added. FIG. 6 shows this in session table 350, where media item B and D each have a score of "2", but they're ordering in the session playlist 204 will be based on their timestamp (TS). That is to say, media item B was added before media item D, and although they have the same score, media item B is higher up in the session playlist 204.

Further, songs with the same score and different number of votes will be ordered by the number of down-votes. The track with more down-votes will be under the other in the queue (e.g., session playlist). The reason for this mechanic is that up-votes are, in one embodiment, worth a point and down-votes could be worth less, so full point down-votes are a stronger signal than an up-vote. Also in general, with a shared playlist it's better to offend less people than to make more people happy.

To illustrate one example, assume that two users are adding songs to the playlist. Neither are voting on any tracks, so all songs have a score of 1. The first track that was added will be played first. The second track to be played will be the one added second and so on. Now, two tracks are in the queue both with scores of 4. Track A has 5 up-votes and 2 down-votes. Track B has 3 up-votes and no down-votes. Track B will actually be ranked higher because no one is against listening to Track B while two people really don't want to hear Track A.

Once again, although a song is described as an example, any type of media item, in digital form, can be made part of the session playlist 204. In one specific example, media items added to the session playlist 204 should be of relatively short form, to allow play of a plurality of media items during the session. Further, in one embodiment, the session may be the time during which the users are interacting with each other in the conference sharing session. Of course, the conference can be for fun (e.g., hanging out with friends, or business).

The users, for example, will be using their own computing device to access the social media network 112, and start the session at a particular point in time. The session, may last as long as the participants desire. For example, sessions can be a few minutes to several hours, depending on the context of the session. If the session is for recreational enjoyment, the session may take a few minutes or many hours. If the session is for business purposes, the session can also be a few minutes or last many hours. In this context, the shared session playlist 204 is maintained and processed during the session. Once the session is complete, the playlist is also removed.

Statistics regarding the types of media items played, shared, commented on, etc., are in one embodiment processed to enable better communication with the users at a later time. Still further, the statistics can also be used to communicate status information or facts to friends of the user or users, regarding the session. Such status information or facts can be in the form of postings to the users stream in their social network, provided permission is provided for posting by the user. For example, a fun fact may be "Jane likes to listen to SONG A when the genre of music listened to is Reggae." An additional fact that may be posted could read "Bob is in a hang-out with Rick, and they are listening the following playlist, click here to check it out!" In some cases, if some of your friends have similar tastes in media (e.g., audio, video, games, etc.), the user's social network could suggest friends to invite to a hang-out, where certain playlists can be shared and voted on. One message might read, "Why don't you invite Jane to a hang-out? She also enjoys Reggae, and she may add something cool to your playlist!"

Additional information provided by analysis of the statistics may be, recommendations to users entering a session, if some of those users commonly listen to a type of music during a session. For example, if a group of people have entered into a session every Friday night for several hours, a recommendation engine can provide the group with a number of songs that they would likely enjoy during their next session.

The system could provide the users with a recommendation such as "When you participate in a session with Rick and Bob on Sunday afternoons, you enjoy Brazilian music . . . here are a few suggestions for your session." In yet another embodiment, the system can generate an automatic post to friends of the users who are participating in the session. The automatic post can provide generic information regarding what the users enjoy listening to or watching, as it relates to a session playlist. For example, the system may post to the user's stream the following "Rick was listening to cool jazz music with Bob, take a listen to some of the music in their shared playlist."

Given the above examples, it should be evident that the type and form of notifications, messages, posts, etc., that can be communicated to friends of user participants, as they relates to playlists shared during a session, are many. Accordingly, the noted example posts and facts, obtained from the historical or current interaction (with applied logic and context), can expand to numerous contexts and formats, as data regarding the use and interaction with shared playlists is processed.

Further, as noted above, the above-noted methodology can be applied to a playlist of online videos, as well instead of just tracks (e.g., audio or music). In an alternative embodiment, down-votes could be worth a full point in order to make it so that anyone has full veto power no matter how many songs they down-vote. Also, song scores could be rounded to the nearest integer, so too many down-votes from one user wouldn't actually have any real effect on the rankings. It is also possible to break ties with up-votes or total number of votes.

However, breaking ties by less down-votes would also work. It is also possible to do a version where people/users rate songs (media items) from 1-5 stars, instead of up or down. Accordingly, it should be understood that any type of rating mechanism can be utilized, and analyzed to automatically adjust the score of a session playlist during a session, and rewriting the individual media items for play by a group participating in the session.

Figure 8:
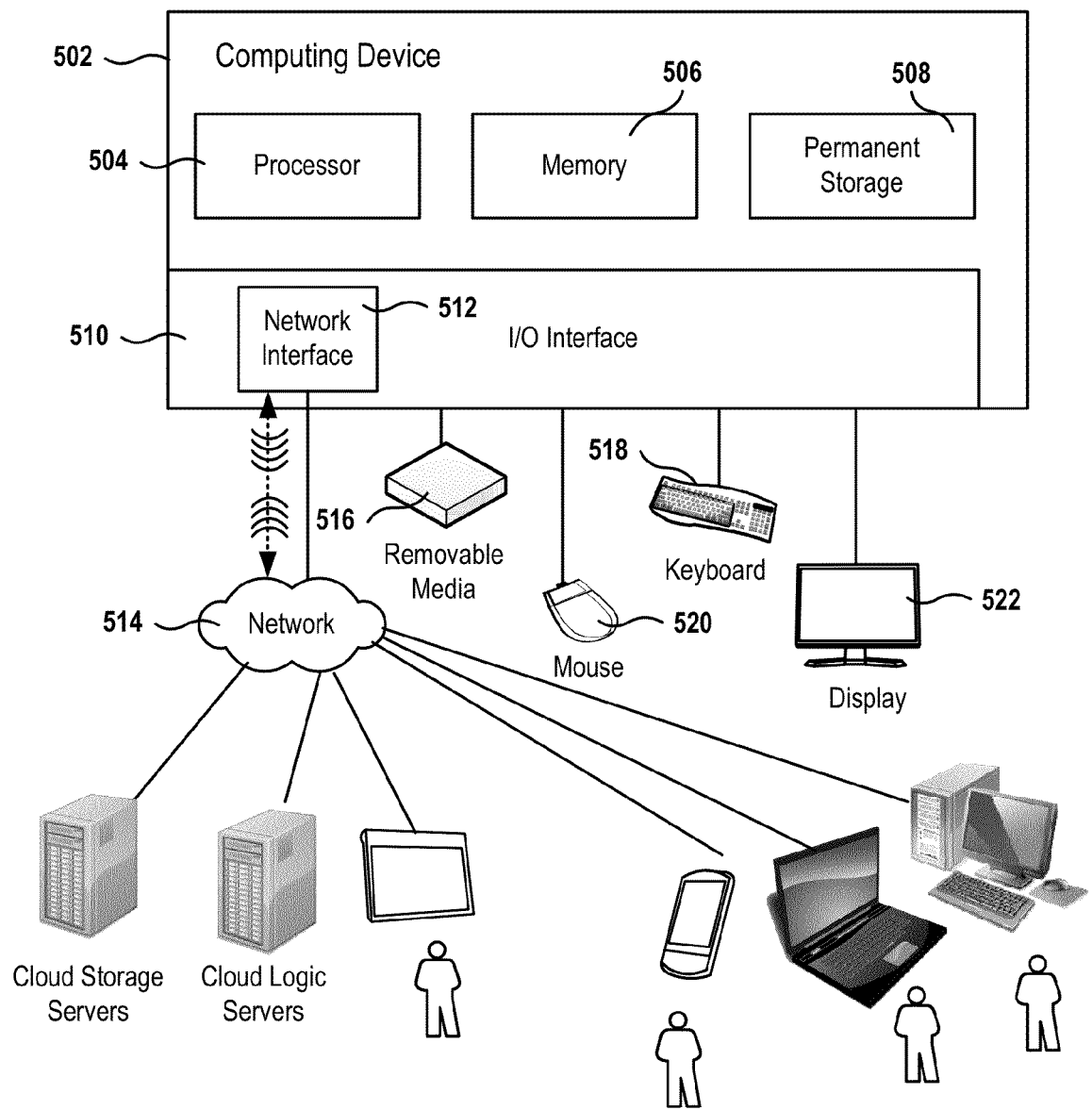
FIG. 8 is a simplified schematic diagram of a computer system for implementing embodiments of the present invention.

FIG. 8 is a simplified schematic diagram of a computer system 502 for implementing embodiments of the present invention. FIG. 8 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system 502 includes a processor 504, which is coupled through a bus to memory 506, permanent storage 508, and Input/Output (I/O) interface 510.

Permanent storage 508 represents a persistent data storage device such as a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data that can be read by a computer system. Examples of the non-transitory computer readable storage medium include permanent storage 508, network attached storage (NAS), read-only memory or random-access memory in memory module 506, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 8 shows various types of devices that can connect to the network, such as the Internet. The devices include servers, tablet computers, smartphones, laptops, desktops, etc. The various devices can run operating systems, and the operating systems can vary from manufacturer to manufacturer.

Some, or all operations of the method presented herein are executed through a processor, such as processor 504 of FIG. 8. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for managing ordering of media items for play, comprising:
    establishing at a processor a session between two or more connected devices over a network;
    receiving a request from one of the connected devices to create a shared media playlist for a duration of a session, once the session is started, the shared media playlist is enabled to accept addition of a plurality of media items from at least one of the connected devices;
    collecting vote input from one or more of the connected devices, the vote input being applied to selected ones of the plurality of media items in the shared media playlist;
    processing the collected vote input to determine a score for at least one of the plurality of media items;
    enforcing an up-vote constraint and a down-vote constraint for each of the plurality of connected devices from which vote input is collected; and
    ordering the plurality of media items in the shared media playlist based on the score for each of the plurality of media items, the plurality of media items being identified in a session table that identifies metadata, a current score, and a current play count of each of the plurality of media items being played in the session, maintains the ordering during the duration of the session, the session table being cleared when the session ends.

2. The method of claim 1, wherein the session between the connected devices enables conference sharing of video and audio, the conference sharing providing a real-time exchange of data between the connected devices.

3. The method of claim 2, wherein the conference sharing is facilitated through an interface of a social networking site, and users of the plurality of connected device interface with the social networking site.

4. The method of claim 1, further comprising,
    obtaining the plurality of media items from one or more of storage of a media content provider logic (MCPL) server, storage of a music provider logic (MPL) server, storage connected to the Internet, or storage of one of the plurality of connected devices.

5. The method of claim 4, wherein the plurality of media items being one or more of music files, music clips, music videos, video files, video clips, advertising files, advertising clips, user-generated-content (UGC), or combinations thereof.

6. The method of claim 1, further comprising,
    tracking a play count associated with each media item played during the session, and in response to playing a particular one of the plurality of media items, increasing the play count associated with the particular one of the plurality of media items; and positioning the particular one of the plurality of media items at an end of the shared media playlist.

7. The method of claim 1, further comprising,
    tracking a play count associated with each media item played during the session, and in response to playing a particular one of the plurality of media items increasing a play count associated with the particular one of the plurality of media items; and
    removing the particular one of the plurality of media items from the shared media playlist.

8. The method of claim 1, further comprising,
during the session, maintaining a play count and score associated with each of the media items added to the shared media playlist, and
in response to adding a particular one of the plurality of media items that was previously removed from the shared media playlist, retaining the play count and score associated with the particular one of the plurality of media items prior to removal from the shared media playlist.

9. The method of claim 1, wherein,
enforcing an up-vote constraint adds one point to the score, and
enforcing a down-vote constraint reduces the score by one point or less.

10. The method of claim 1, wherein enforcing the down-vote constraint comprises:
reducing the score by the fraction of one point divided by the total down-votes minus the total up-votes, when the total down-votes is greater than the total up-votes; and
reducing the score by one point when the total down-votes is less than or equal to the total up-votes.

11. The method of claim 1, wherein enforcing the up-vote and down-vote constraints including determining whether the vote collected from the particular connected device is validated for permission to add the up or down-vote for the particular media item.

12. The method of claim 1, further comprising providing a video chat during the session.

13. The method of claim 1, further comprising,
collecting statistics regarding the scoring of the media items by users of the two or more connected devices, and
automatically posting the statistics regarding the scoring on a social networking page of at least one of the users.

14. A non-transitory computer-readable medium encoding instructions for managing an ordering of media items that, in response to execution by a computing device, cause the computing device to perform operations comprising:
establishing a session between two or more connected devices over a network;
receiving a request from one of the connected devices to create a shared media playlist for a duration of a session, once the session is started, the shared media playlist is enabled to accept addition of a plurality of media items from at least one of the connected devices;
collecting vote input from one or more of the connected devices, the vote input being applied to selected ones of the plurality of media items in the shared media playlist;
processing the collected vote input to determine a score for at least one of the plurality of media items;
enforcing an up-vote constraint and a down-vote constraint for each of the plurality of connected devices from which vote input is collected; and
ordering the plurality of media items in the shared media playlist based on the score for each of the plurality of media items, the plurality of media items being identified in a session table that identifies metadata, a current score, and a current play count of each the plurality of media items being played in the session, maintains the ordering during the duration of the session, the session table being cleared when the session ends.

15. The non-transitory computer-readable medium of claim 14, wherein the session between the connected devices enable conference sharing of video and audio, the conference sharing providing a real-time exchange of data between the connected devices, and wherein the conference sharing is facilitated through an interface of a social networking site, and users of the plurality of connected device interface with the social networking site.

16. The non-transitory computer-readable medium of claim 14, further comprising,
obtaining the plurality of media items from one or more of storage of a media content provider logic (MCPL) server, storage of a music provider logic (MPL) server, storage connected to the Internet, or storage of one of the plurality of connected devices, and the plurality of media items being one or more of music files, music clips, music videos, video files, video clips, advertising files, advertising clips, user-generated-content (UGC), or combinations thereof.

17. The non-transitory computer-readable medium of claim 14, further comprising,
tracking a play count associated with each media item played during the session, and
in response to playing a particular one of the plurality of media items, increasing the a play count associated with the particular one of the plurality of media items, and
positioning the particular one of the plurality of media items at an end of the shared media playlist.

18. The non-transitory computer-readable medium of claim 14, further comprising,
tracking a play count associated with each media item played during the session, and
in response to playing a particular one of the plurality of media items increasing a play count associated with the particular one of the plurality of media items; and
removing the particular one of the plurality of media items from the shared media playlist.

19. The non-transitory computer-readable medium of claim 14, further comprising,
during the session, maintaining a play count and score associated with each of the media items added to the shared media playlist, and
in response to adding a particular one of the plurality of media items that was previously removed from the shared media playlist retaining the play count and score associated with the particular one of the plurality of media items prior to removal from the shared media playlist.

20. The non-transitory computer-readable medium of claim 14, program instructions for,
enforcing an up-vote constraint adds one point to the score, and
enforcing a down-vote constraint reduces the score by one point or less.

21. The non-transitory computer-readable medium of claim 14, wherein enforcing the down-vote constraint comprises,
reducing the score by the fraction of one point divided by the total down-votes minus the total up-votes, when the total down-votes is greater than the total up-votes; and
reducing the score by one point when the total down-votes is less than or equal to the total up-votes.

22. The non-transitory computer-readable medium of claim 14, wherein enforcing the up-vote and down-vote constraints including determining whether the vote collected from the particular connected device is validated for permission to add the up or down-vote for the particular media item.

23. The non-transitory computer-readable medium of claim 14, further comprising,
providing a video chat during the session.

24. The non-transitory computer-readable medium of claim 14, further comprising,
  collecting statistics regarding the scoring of the media items by users of the two or more connected devices, and
  automatically posting the statistics regarding the scoring on a social networking page of at least one of the users.

25. A system for managing ordering of media items for play, comprising:
  a server having a processor and access to storage, the server further including logic executable by the processor for performing operations comprising:
  establishing a session between two or more connected devices over a network;
  receiving a request from one of the connected devices to create a shared media playlist for a duration of a session, once the session is started, the shared media playlist is enabled to accept addition of a plurality of media items from at least one of the connected devices;
  collecting vote input from one or more of the connected devices, the vote input being applied to selected ones of the plurality of media items in the shared media playlist;
  processing the collected vote input to determine a score for at least one of the plurality of media items;
  enforcing an up-vote constraint and a down-vote constraint for each of the plurality of connected devices from which vote input is collected; and
  ordering the plurality of media items in the shared media playlist based on the score for each of the plurality of media items, the plurality of media items being identified in a session table that identifies metadata, a current score, and a currently play count of each of the plurality of media items being played in the session, maintains the ordering during the duration of the session, the session table being cleared when the session ends.

* * * * *